United States Patent
Park et al.

(10) Patent No.: US 8,110,305 B2
(45) Date of Patent: Feb. 7, 2012

(54) RECHARGEABLE LITHIUM BATTERY

(75) Inventors: Su-Yeong Park, Yongin-si (KR);
Nam-Soon Choi, Yongin-si (KR);
Kyoung-Han Yew, Yongin-si (KR);
Doo-Kyoung Lee, Yongin-si (KR);
Sung-Soo Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 856 days.

(21) Appl. No.: 11/834,335

(22) Filed: Aug. 6, 2007

(65) Prior Publication Data

US 2008/0292972 A1    Nov. 27, 2008

(30) Foreign Application Priority Data

Feb. 15, 2007  (KR) .................... 10-2007-0016081

(51) Int. Cl.
  *H01M 6/04* (2006.01)
  *H01M 4/02* (2006.01)
  *H01M 4/13* (2006.01)
  *H01M 4/58* (2006.01)

(52) U.S. Cl. ..... 429/189; 429/188; 429/209; 429/218.1; 429/231.5

(58) Field of Classification Search ........... 429/122–255
See application file for complete search history.

(56) References Cited

U.S. PATENT DOCUMENTS

| | | | |
|---|---|---|---|
| 5,284,721 A | 2/1994 | Beard | |
| 5,378,560 A | 1/1995 | Tomiyama | |
| 5,478,671 A | 12/1995 | Idota | |
| 5,506,075 A | 4/1996 | Iwasaki et al. | |
| 5,700,598 A | 12/1997 | Denis et al. | |
| 5,705,291 A | 1/1998 | Amatucci et al. | |
| 5,795,679 A | 8/1998 | Kawakami et al. | |
| 6,071,489 A | 6/2000 | Sun et al. | |
| 6,210,834 B1 | 4/2001 | Kweon et al. | |
| 6,221,531 B1 | 4/2001 | Vaughey et al. | |
| 6,316,143 B1 | 11/2001 | Foster et al. | |
| 6,322,928 B1 | 11/2001 | Thackeray et al. | |
| 6,482,537 B1 | 11/2002 | Strangman et al. | |

(Continued)

FOREIGN PATENT DOCUMENTS

CN    1298556 A    6/2001

(Continued)

OTHER PUBLICATIONS

U.S. Office action dated May 13, 2009, for related U.S. Appl. No. 11/947,708, 25 pages.

(Continued)

*Primary Examiner* — Barbara Gilliam
*Assistant Examiner* — Steven Scully
(74) *Attorney, Agent, or Firm* — Christie, Parker & Hale, LLP

(57) ABSTRACT

A rechargeable lithium battery including: a negative electrode comprising lithium-vanadium oxide having the following Formula 1 and being capable of intercalating and deintercalating lithium ions, and a carbon-based material; a positive electrode comprising a positive active material capable of intercalating and deintercalating lithium ions; and an electrolyte comprising a monomer including alkylene oxide and a reactive double bond, a lithium salt, and a non-aqueous organic solvent.

$$Li_xM_yV_zO_{2+d} \quad \text{Chemical Formula 1}$$

In Formula 1, $0.1 \leq x \leq 2.5$, $0 \leq y \leq 0.5$, $0.5 \leq z \leq 1.5$, $0 \leq d \leq 0.5$, and M is at least one metal selected from the group consisting of Al, Cr, Mo, Ti, W, and Zr.

21 Claims, 2 Drawing Sheets

U.S. PATENT DOCUMENTS

| | | | |
|---|---|---|---|
| 6,596,437 B2 | 7/2003 | Yoon et al. | |
| 6,617,073 B1 | 9/2003 | Matsumoto et al. | |
| 6,767,669 B2 | 7/2004 | Matsubara et al. | |
| 6,783,890 B2 | 8/2004 | Kweon et al. | |
| 6,911,282 B2 | 6/2005 | Kasamatsu et al. | |
| 6,986,968 B2 | 1/2006 | Hong et al. | |
| 2001/0019774 A1 | 9/2001 | Suzuki et al. | |
| 2001/0046628 A1 | 11/2001 | Oesten et al. | |
| 2001/0055711 A1 | 12/2001 | Ito et al. | |
| 2003/0003362 A1 | 1/2003 | Leising et al. | |
| 2003/0031919 A1 | 2/2003 | Isozaki et al. | |
| 2003/0049541 A1 | 3/2003 | Inagaki et al. | |
| 2003/0124431 A1* | 7/2003 | Hwang et al. | 429/316 |
| 2003/0130114 A1 | 7/2003 | Hampden-Smith et al. | |
| 2003/0207178 A1 | 11/2003 | Hu et al. | |
| 2003/0211396 A1 | 11/2003 | Kobayashi et al. | |
| 2003/0215700 A1 | 11/2003 | Hosoda et al. | |
| 2004/0005265 A1 | 1/2004 | Chiang et al. | |
| 2004/0018431 A1* | 1/2004 | Gozdz et al. | 429/309 |
| 2004/0029010 A1* | 2/2004 | Sada et al. | 429/231.4 |
| 2004/0072073 A1 | 4/2004 | Okochi et al. | |
| 2004/0106040 A1 | 6/2004 | Fukuoka et al. | |
| 2004/0157133 A1* | 8/2004 | Kim et al. | 429/326 |
| 2005/0042515 A1 | 2/2005 | Hwang et al. | |
| 2005/0079417 A1* | 4/2005 | Kim et al. | 429/231.2 |
| 2005/0164090 A1* | 7/2005 | Kim et al. | 429/232 |
| 2005/0191550 A1 | 9/2005 | Satoh et al. | |
| 2006/0088766 A1 | 4/2006 | Kim et al. | |
| 2006/0166098 A1 | 7/2006 | Tabuchi et al. | |
| 2006/0236528 A1 | 10/2006 | Xu et al. | |
| 2007/0099085 A1 | 5/2007 | Choi et al. | |
| 2007/0166615 A1 | 7/2007 | Takamuku et al. | |
| 2007/0207384 A1 | 9/2007 | Nakura | |
| 2008/0118834 A1 | 5/2008 | Yew et al. | |
| 2008/0118840 A1 | 5/2008 | Yew et al. | |
| 2008/0118841 A1 | 5/2008 | Kim et al. | |
| 2008/0145758 A1 | 6/2008 | Kim et al. | |
| 2008/0182171 A1 | 7/2008 | Maeda et al. | |
| 2008/0182172 A1 | 7/2008 | Takamuku et al. | |
| 2008/0241688 A1 | 10/2008 | Tokita et al. | |
| 2008/0254365 A1 | 10/2008 | Kim et al. | |
| 2008/0305397 A1 | 12/2008 | Kobayashi et al. | |
| 2009/0023070 A1 | 1/2009 | Tokita et al. | |
| 2009/0068566 A1 | 3/2009 | Park et al. | |
| 2010/0143800 A1 | 6/2010 | Sawada et al. | |

FOREIGN PATENT DOCUMENTS

| | | |
|---|---|---|
| CN | 1304187 | 7/2001 |
| CN | 1339834 | 3/2002 |
| CN | 1416600 | 5/2003 |
| CN | 1417876 | 5/2003 |
| CN | 1607687 A | 4/2005 |
| CN | 1624960 | 6/2005 |
| CN | 1783551 | 6/2006 |
| CN | 1992420 A | 7/2007 |
| EP | 1 511 101 A2 | 3/2005 |
| EP | 1 708 296 A1 | 10/2006 |
| EP | 1 801 908 | 6/2007 |
| JP | 59-020971 | 2/1984 |
| JP | 06-060867 | 3/1994 |
| JP | 06-275265 | 9/1994 |
| JP | 06-302320 | 10/1994 |
| JP | 06-325791 | 11/1994 |
| JP | 07-014580 | 1/1995 |
| JP | 07-029600 | 1/1995 |
| JP | 07-029608 | 1/1995 |
| JP | 07-122298 | 5/1995 |
| JP | 08-124568 | 5/1996 |
| JP | 08-241707 | 9/1996 |
| JP | 10-188977 | 7/1998 |
| JP | 10-247497 | 9/1998 |
| JP | 10-270018 | 10/1998 |
| JP | 11-185753 | 7/1999 |
| JP | 2000-058059 | 2/2000 |
| JP | 2000-090916 | 3/2000 |
| JP | 2000-299132 | 10/2000 |
| JP | 2001-006683 | 1/2001 |
| JP | 2001-297796 | 10/2001 |
| JP | 2001-325950 | 11/2001 |
| JP | 2002-216753 | 8/2002 |
| JP | 2002-326818 | 11/2002 |
| JP | 2002-343431 | 11/2002 |
| JP | 2002-352801 | 12/2002 |
| JP | 2002-362923 | 12/2002 |
| JP | 2003-017053 | 1/2003 |
| JP | 2003-68305 | 3/2003 |
| JP | 2003-142096 | 5/2003 |
| JP | 2004-139947 | 5/2004 |
| JP | 2004-149391 | 5/2004 |
| JP | 2004-327190 | 11/2004 |
| JP | 2005-072008 | 3/2005 |
| JP | 2005-135872 | 5/2005 |
| JP | 2005-158604 | 6/2005 |
| JP | 2005-216855 | 8/2005 |
| JP | 2006-128115 | 5/2006 |
| JP | 2007-173096 | 7/2007 |
| KR | 2000-0060301 | 10/2000 |
| KR | 2001-0090522 | 10/2001 |
| KR | 10-0331370 | 8/2002 |
| KR | 2003-0021112 | 3/2003 |
| KR | 10-2003-00322 20 | 4/2003 |
| KR | 2004-0082803 | 9/2004 |
| KR | 2005-20185 | 3/2005 |
| KR | 2005-52268 | 6/2005 |
| KR | 10-2005-00770 79 | 8/2005 |
| KR | 2006-0028327 | 3/2006 |
| KR | 10-0570648 | 4/2006 |
| KR | 10-0570649 | 4/2006 |
| KR | 10-2006-0041828 | 5/2006 |
| KR | 10-2006-0050745 | 5/2006 |
| KR | 2006-0095221 | 8/2006 |
| KR | 2007-0016431 | 2/2007 |
| KR | 10-0759410 B1 | 9/2007 |
| KR | 2007-0091938 | 9/2007 |
| WO | WO 95/02001 A1 | 1/1995 |
| WO | WO 97/28569 | 8/1997 |
| WO | WO 02/061864 A1 | 8/2002 |
| WO | WO 03/038931 A1 | 5/2003 |
| WO | WO 03/096449 A1 | 11/2003 |
| WO | WO 2006/115681 A2 | 11/2006 |

OTHER PUBLICATIONS

U.S. Office action dated Jul. 2, 2009, for related U.S. Appl. No. 11/937,462, 15 pages.

U.S. Office action dated Jun. 10, 2010, for related U.S. Appl. No. 11/258,150, 15 pages.

SIPO Office action dated Aug. 28, 2009, for Chinese application 200710152425.4, 8 pages.

SIPO Office action dated Dec. 29, 2010, for Chinese application 200810149608.5, with English translation, 18 pages.

SIPO Office action dated Sep. 21, 2010 for Chinese Patent application 200710169308.9, with English translation, 11 pages.

SIPO Office action dated Aug. 14, 2009 for Chinese Patent application 200710169308.9, 6 pages.

SIPO Office Action dated Oct. 18, 2010 for Chinese Patent application 200710169731.9. with English translation, 12 pages.

SIPO Office action dated Oct. 13, 2010 for Chinese Patent application 200710169303.6. with English translation, 13 pages.

SIPO Office Action dated May 25, 2010 for Chinese Patent application 200710169731.9, 5 pages.

SIPO Office Action dated Aug. 21, 2009 for. Chinese Patent application 200710169731.9, with English translation, 6 pages.

KIPO Office action dated Aug. 29, 2009 for Korean Patent application Oct. 2007-0091028, 4 pages.

KIPO Office action dated May 31, 2010 for Korean Patent application Oct. 2008-0063918, 5 pages.

European Search Report dated Jun. 12, 2008 for European Patent application 07121189.0, 9 pages.

European Search Report dated Nov. 13, 2006, for European application 04090319.7, 4 pages.

European Search Report dated Feb. 18, 2008, for European application 07120913.4, 6 pages.

European Search Report dated Feb. 27, 2008 for European Patent application 07121149.4, 13 pages.

European Search Report dated Jun. 2, 2008, for European application 08100042.4, 10 pages.

European Search Report dated Jun. 2, 2008, for European application 07116182.2, 8 pages.

Kim, S., *Synthesis and characterization of* $MnV_2O_6$ *as a high capacity anode material for a lithium secondary battery*, Solid State Ionics vol. 139 (2001), pp. 57-65.

Andrukaitis, *Study of* $Me_x(VO_3)_2$ *vanadates*, (Me=Co, Ni, Mn, 1<x<2) *for lithium rechargeable cells*, Journal of Power Sources 81-82 (1999) pp. 651-655.

Yamamoto, et al., *Anode Properties of* $Li1+xV1-xO2$ *for Lithium Secondary Batteries*, JASRI/Spring 8, pp. 332-333.

Van Landschoot, N., *Citric acid-assisted synthesis and characterization of doped* $LiCoVO4$, Solid State Ionics, vol. 166, (2004), Science Direct, pp. 307-316.

Sivashanmugam, A., *Glycine-Assisted Sol-Gel Combustion Synthesis and Characterization of Aluminum-Doped* $LiNiVO4$ *for Use in Lithium-Ion Batteries*, Journal of Electrochemical Society, vol. 153, No. 3, (2006), pp. A497-A503, Xp-002475390.

Huang, F., et al., *A novel* $Li2Ag0.5V2O5$ *Composite Film Cathode for All-Solid-State Lithium Batteries*, Electrochemistry Communications, vol. 5, (2003), pp. 262-266.

Ohzuku et al., *Zero-Strain Insertion Material of* $Li[Li1/3Ti5/3]O4$ *for Rechargeable Lithium Cells*, Journal of the Electrochemical Society, vol. 142, No. 5, May 1995, pp. 1431-1435, Xp-002401881.

Mi, et al., *Carbon-coated* $Li1.2Cr0.4Ti0.4O2$ *Cathode Material for Lithium-Ion Batteries*, Electrochemical and Solid-State Letters, vol. 9, No. 7, (2006), pp. A324-A327, Xp-002467438.

Japanese Office action dated Sep. 7, 2010 for Japanese Patent application 2007-153122, 2 pages.

Japanese Office action dated Aug. 31, 2010 for Japanese Patent application 2007-175311, 3 pages.

Japanese Office action dated Mar. 29, 2011 for Japanese Patent application 2007-303286, 4 pages.

Patent Abstracts of Japan and English machine translation for Japanese Publication 06-325791, listed above, 36 pages.

Patent Abstracts of Japan, and English machine translation of Japanese Publication 07-014580, listed above, 21 pages.

Patent Abstracts of Japan and English machine translation for Japanese Publication 2001-006683, listed above, 13 pages.

Patent Abstracts of Japan and English machine translation for Japanese Publication 2002-326818, listed above, 48 pages.

Patent Abstracts of Japan and English machine translation for Japanese Publication 2002-352801, listed above, 13 pages.

Patent Abstracts of Japan and English machine translation for Japanese Publication 2002-362923 listed above, 17 pages.

Patent Abstracts of Japan and English machine translation for Japanese Publication 2004-149391 listed above, 100 pages.

Occlude.Dictionary.com, Random House, Inc., Accessed Jul. 15, 2010, 2 pages.

Absorbtion.Dictionary.com, Random House, Inc., Accessed Jul. 15, 2010, 2 pages.

Oskam, et al, *Sol-Gel Synthesis of Carbon/Silica Gel Electrodes for Lithium Intercalation*, Electrochemical and Solid-State Letters, vol. 2, No. 12, Dec. 12, 1999, pp. 610-612, XP 001101158.

Ng, et al, *Si-O network encapsulated graphite-silicon mixtures as negative electrodes for lithium-ion batteries*, Journal of Power Sources, vol. 94, No. 1, Feb. 15, 2001, pp. 63-67, XP 001164263.

Aurbach, et al, *Behavior of lithiated graphite electrodes comprising silica based binder*, Journal of Applied Electrochemistry, vol. 28, No. 10, Oct. 10, 1998, pp. 1051-1059, XP 000786929.

Chen, et al, *Improving the Performance of Soft Carbon for Lithium-Ion Batteries*, Electrochimica acta, vol. 51, No. 19, May 20, 2006, pp. 3890-3894, XP 5427738A.

\* cited by examiner

RECHARGEABLE LITHIUM BATTERY

CROSS-REFERENCE TO RELATED APPLICATIONS

This application claims the benefit of Korean Application No. 2007-16081 filed Feb. 15, 2007, in the Korean Intellectual Property Office, the disclosure of which is incorporated herein, by reference.

BACKGROUND OF THE INVENTION

1. Field of the Invention

Aspects of the present invention relate to a rechargeable lithium battery having improved cycle-life characteristics.

2. Description of the Related Art

Rechargeable lithium batteries have recently drawn attention as power sources for small portable electronic devices. Rechargeable lithium batteries use an organic electrolyte solution, have a high energy density, and have a discharge voltage twice as high as conventional batteries that use an alkali aqueous solution.

Rechargeable lithium batteries can have a positive active material, for example a lithium-transition element composite oxide capable of intercalating lithium. For example, $LiCoO_2$, $LiMn_2O_4$, $LiNiO_2$, $LiNi_{1-x}Co_xO_2$ (0<x<1), $LiMnO_2$, and the like, have been researched.

Rechargeable lithium batteries can have a negative active material namely, various carbon-based materials. For example, artificial and natural graphite, and hard carbon, all of which can intercalate and deintercalate lithium ions. The use of graphite increases a discharge voltage and the energy density of a battery, because graphite has a relatively low discharge potential of −0.2V, as compared to lithium. A battery using graphite as a negative active material has a high average discharge potential of 3.6V and an excellent energy density. Furthermore, graphite is the most comprehensively used of the aforementioned carbon-based materials, since graphite guarantees better cycle-life characteristics for a battery, due to its outstanding reversibility. However, a graphite active material has a low density, and consequently, a low capacity (theoretical capacity: 2.2 g/cc), in terms of energy density per unit volume, when used as a negative active material. Furthermore, the use of a graphite active material entails possible dangers when a battery is misused, overcharged, and the like, such as, explosion or combustion, since graphite is likely to react with an organic electrolyte, at a high discharge voltage.

In order to solve these problems, a great deal of research on oxide negative electrodes has recently been performed. For example, amorphous tin oxide, developed by Japan Fuji Film Co., Ltd., has a high capacity per weight (800 mAh/g). However, this oxide has resulted in some critical deficiencies, such as having a high initial irreversible capacity of up to 50%. Furthermore, amorphous tin oxide has a discharge potential of more than 0.5V and shows a smooth voltage profile, which is unique to the amorphous phase. Consequently, it is difficult to establish a tin oxide that is applicable to a battery. Furthermore tin oxide tends to be reduced to tin, during a charge/discharge reaction, which is a disadvantage for use in a battery.

Referring to another oxide negative electrode, a negative active material of $Li_aMg_bVO_c$ (0.05≦a≦3, 0.12≦b≦2, 2≦2c−a−2b≦5) is disclosed in Japanese Patent Publication No. 2002-216753. A lithium secondary battery including $Li_{1.1}V_{0.9}O_2$ an oxide negative electrode was also presented in the 2002 Japanese Battery Conference (Preview No. 3B05). Such oxide negative electrodes do not show sufficient battery performance, and therefore, there has been a great deal of further research into oxide negative active materials.

Referring to yet another oxide negative electrode, a negative active material of a vanadium oxide not including Li was disclosed in Solid State Ionics, 139, 57-65, 2001 and Journal of Power Source, 81-82, 651-655, 1999. However, this active material has a different crystal structure from the active materials of the present invention. In addition, since the active material has an average discharge potential of more than 1.0 V, it may have problems when used as a negative electrode.

SUMMARY OF THE INVENTION

Embodiments of the present invention provide a rechargeable lithium battery that can suppress side-reactions at the interface of an oxide-based negative electrode and an electrolyte, and can thereby improve cycle-life characteristics.

According to various embodiments of the present invention, provided is a rechargeable lithium battery that includes: a negative electrode including lithium-vanadium oxide, having the following Formula 1, which is capable of intercalating and deintercalating lithium ions, and a carbon-based material; a positive electrode including a positive active material capable of intercalating and deintercalating lithium ions; and an electrolyte including a monomer including alkylene oxide and a reactive double bond, a lithium salt, and a non-aqueous organic solvent.

$$Li_xM_yV_zO_{2+d} \qquad \text{[Chemical Formula 1]}$$

In Formula 1, 0.1≦x≦2.5, 0≦y≦0.5, 0.5≦z≦1.5, 0≦d≦0.5, and M is at least one metal selected from the group consisting of Al, Cr, Mo, Ti, W, and Zr.

According to various embodiments of the present invention, the negative electrode includes a lithium-vanadium oxide core material of the above Formula 1 and a carbon-based material coated thereon. The carbon-based material includes at least one selected from the group consisting of natural graphite, artificial graphite, graphitized carbon fiber, graphitized mesocarbon microbeads, fullerenes, amorphous carbon, and mixtures thereof.

The monomer may be represented by the following Formula 2.

$$R_1-\underset{\underset{R_4}{\overset{\overset{O}{\|}}{\underset{\|}{C}}}{C}}{\overset{}{C}}-O-(R_2-O)_n-R_3 \qquad \text{[Chemical Formula 2]}$$

In Formula 2, $R_1$, $R_3$, and $R_5$ are each independently hydrogen or an alkyl, $R_2$ is an alkyl, $R_4$ is an alkoxy, and n is an integer ranging from 1≦n≦10.

The monomer includes at least one selected from the group consisting of ethylene glycol methylether(metha)acrylate [EGME(M)A], ethylene glycol phenylether(metha)acrylate [EGPE(M)A], diethylene glycol methylether(metha)acrylate [DEGME(M)A], diethylene glycol 2-ethylhexylether(metha) acrylate [DEGEHE(M)A], polyethylene glycol methylether (metha)acrylate [PEGME(M)A], polyethylene glycol ethylether(metha)acrylate [PEGEE(M)A], polyethylene glycol 4-nonylphenylether(metha)acrylate [PEGNPE(M)A], polyethylene glycol phenylether(metha)acrylate [PEGPE(M)A], ethylene glycol dicyclopentenyl ether(metha)acrylate [EGD- CPE(M)A], polypropylene glycol methylether(metha)acrylate [PPGME(M)A], polypropylene glycol 4-nonylphenylether(metha)acrylate, dipropylene glycol allylether (metha)acrylate, and mixtures thereof. The monomer may be present in an amount of 0.01 to 5 wt %, based on the total weight of the electrolyte.

The lithium salt may be at least one selected from the group consisting of LiBOB, LiFOB, LiPF$_6$, LiBF$_4$, LiSbF$_6$, LiAsF$_6$, LiClO$_4$, LiCF$_3$SO$_3$, LiC$_4$F$_9$SO$_3$, LiN(CF$_3$SO$_2$)$_2$, LiN(C$_2$F$_5$SO$_2$)$_2$, LiAlO$_4$, LiAlCl$_4$, LiN(C$_p$F$_{2p+1}$SO$_2$)(C$_q$F$_{2q+1}$SO$_2$), where p and q are natural numbers, LiSO$_3$CF$_3$, LiCl, LiI, and combinations thereof. The lithium salt may be used at a concentration ranging from about 0.7 to 2M.

The non-aqueous organic solvent may include an organic solvent selected from the group consisting of a carbonate-based solvent, an ester-based solvent, an ether-based solvent, a ketone-based solvent, and mixtures thereof. The carbonate-based solvent may include a mixture of a cyclic carbonate and a linear carbonate, in a volume ratio ranging from about 1:1 to 1:9.

The cyclic carbonate may be at least one selected from the group consisting of ethylene carbonate (EC), propylene carbonate (PC), butylenecarbonate (BC), γ-butyrolactone (γ-BL), and mixtures thereof. The linear carbonate includes at least one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), and combinations thereof.

The non-aqueous organic solvent may further include an aromatic hydrocarbon solvent. The non-aqueous organic solvent may include a carbonate-based solvent and an aromatic hydrocarbon solvent, in a volume ratio ranging from about 1:1 to 10:1.

The aromatic hydrocarbon solvent may be represented by the following Formula 3.

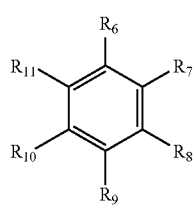

[Chemical Formula 3]

In Formula 3, R$_6$ to R$_{11}$ are independently selected from the group consisting of hydrogen, a halogen, an alkyl, a haloalkyl, and combinations thereof.

The electrolyte may further include an additive of a compound including an ether group, an ethylene carbonate-based compound having the following Formula 4, or a combination thereof.

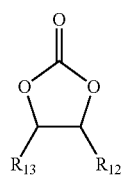

[Chemical Formula 4]

In Formula 4, R$_{12}$ and R$_{13}$ are independently selected from the group consisting of hydrogen, a halogen, cyano (CN), nitro (NO$_2$), and a fluorinated C1 to C5 alkyl, provided that at least one of R$_{12}$ and R$_{13}$ is a halogen, cyano (CN), nitro (NO$_2$), and a fluorinated C1 to C5 alkyl.

The compound including an ether group selected from the group consisting of dimethoxyethane (DME), bis(2-methoxyethylether) (DGM), triethylene glycol dimethylether (TriGM), tetraethylene glycol dimethylether (TetGM), polyethylene glycol dimethylether (PEGDME), propylene glycol dimethylether (PGDME), dioxolan, and mixtures thereof. The compound including an ether group may be present in an amount ranging from about 0.05 to 5 wt %, based on the total weight of the electrolyte.

The positive active material may be selected from the group consisting of compounds represented by the following Formulae 5 to 29.

$Li_aA_{1-b}B_bD_2$ [Chemical Formula 5]

In Formula 5, $0.95 \leq a \leq 1.1$ and $0 \leq b \leq 0.5$.

$Li_aE_{1-b}B_bO_{2-c}F_c$ [Chemical Formula 6]

In Formula 6, $0.95 \leq a \leq 1.1$, $0 \leq b \leq 0.5$, and $0 \leq c \leq 0.05$.

$LiCo_{2-b}O_{4-c}F_c$ [Chemical Formula 7]

In Formula 7, $0 \leq b \leq 0.5$, and $0 \leq c \leq 0.05$.

$LiMn_{2-b}O_{4-c}F_c$ [Chemical Formula 8]

In Formula 8, $0 \leq b \leq 0.5$, and $0 \leq c \leq 0.05$.

$Li_aNi_{1-b-c}Co_bB_cD_\alpha$ [Chemical Formula 9]

In Formula 9, $0.95 \leq a \leq 1.1$, $0 \leq b \leq 0.5$, $0 \leq c \leq 0.05$, and $0 < \alpha \leq 2$.

$Li_aNi_{1-b-c}Co_bO_{2-\alpha}F_\alpha$ [Chemical Formula 10]

In Formula 10, $0.95 \leq a \leq 1.1$, $0 \leq b \leq 0.5$, $0 \leq c \leq 0.05$, and $0 < \alpha \leq 2$.

$Li_aNi_{1-b-c}Co_bO_{2-\alpha}F_2$ [Chemical Formula 11]

In Formula 11, $0.95 \leq a \leq 1.1$, $0 b \leq 0.5$, and $0 \leq c \leq 0.05$.

$Li_aNi_{1-b-c}Mn_bB_cD_\alpha$ [Chemical Formula 12]

In Formula 12, $0.95 \leq a \leq 1.1$, $0 \leq b \leq 0.5$, $0 \leq c \leq 0.05$, and $0 < \alpha \leq 2$.

$Li_aNi_{1-b-c}Mn_bO_{2-\alpha}F_\alpha$ [Chemical Formula 13]

In Formula 13, $0.95 \leq a \leq 1.1$, $0 \leq b \leq 0.5$, $0 \leq c \leq 0.05$, and $0 < \alpha < 2$.

$Li_aNi_{1-b-c}Mn_bO_{2-\alpha}F_2$ [Chemical Formula 14]

In Formula 14, $0.95 \leq a \leq 1.1$, $0 \leq b \leq 0.5$, and $0 \leq c \leq 0.05$.

$Li_aNi_bE_cG_dO_2$ [Chemical Formula 15]

In Formula 15, $0.90 \leq a \leq 1.1$, $0 \leq b \leq 0.9$, $0 \leq c \leq 0.5$, and $0.001 \leq d \leq 0.1$.

$Li_aNi_bCo_cMn_dG_eO_2$ [Chemical Formula 16]

In Formula 16, $0.90 \leq a \leq 1.1$, $0 \leq b \leq 0.9$, $0 \leq c \leq 0.5$, $0 \leq d \leq 0.5$, and $0.001 \leq e \leq 0.1$.

$Li_aNiG_bO_2$ [Chemical Formula 17]

In Formula 17, $0.90 \leq a \leq 1.1$, and $0.001 \leq b \leq 0.1$.

$Li_aCoG_bO_2$ [Chemical Formula 18]

In Formula 18, $0.90 \leq a \leq 1.1$, and $0.001 \leq b \leq 0.1$.

$Li_aMnG_bO_2$ [Chemical Formula 19]

In Formula 19, $0.90 \leq a \leq 1.1$, and $0.001 \leq b \leq 0.1$.

$Li_aMn_2G_bO_4$ [Chemical Formula 20]

In Formula 20, $0.90 \leq a \leq 1.1$, and $0.001 \leq b \leq 0.1$.

$HO_2$ [Chemical Formula 21]

$HS_2$ [Chemical Formula 22]

$LiHS_2$ [Chemical Formula 23]

$V_2O_5$ [Chemical Formula 24]

$LiV_2O_5$ [Chemical Formula 25]

$LiIO_2$ [Chemical Formula 26]

$LiNiVO_4$ [Chemical Formula 27]

$Li_{3-f}J_2(PO_4)_3 (0 \leq f \leq 3)$ [Chemical Formula 28]

$Li_{3-f}Fe_2(PO_4)_3 (0 \leq f \leq 2)$ [Chemical Formula 29]

In the above Formulae 5 to 29: A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, a lanthanide element, and combinations thereof, H is selected from the group consisting of Ti, Mo, Mn, and combinations thereof; I is selected from the group consisting of Cr, V, Fe, Sc, Y and combinations thereof; and J is selected from the group consisting of V, Cr, Mn, Co, Ni, Cu, and combinations thereof.

The rechargeable lithium battery may be a lithium ion battery or a lithium polymer battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
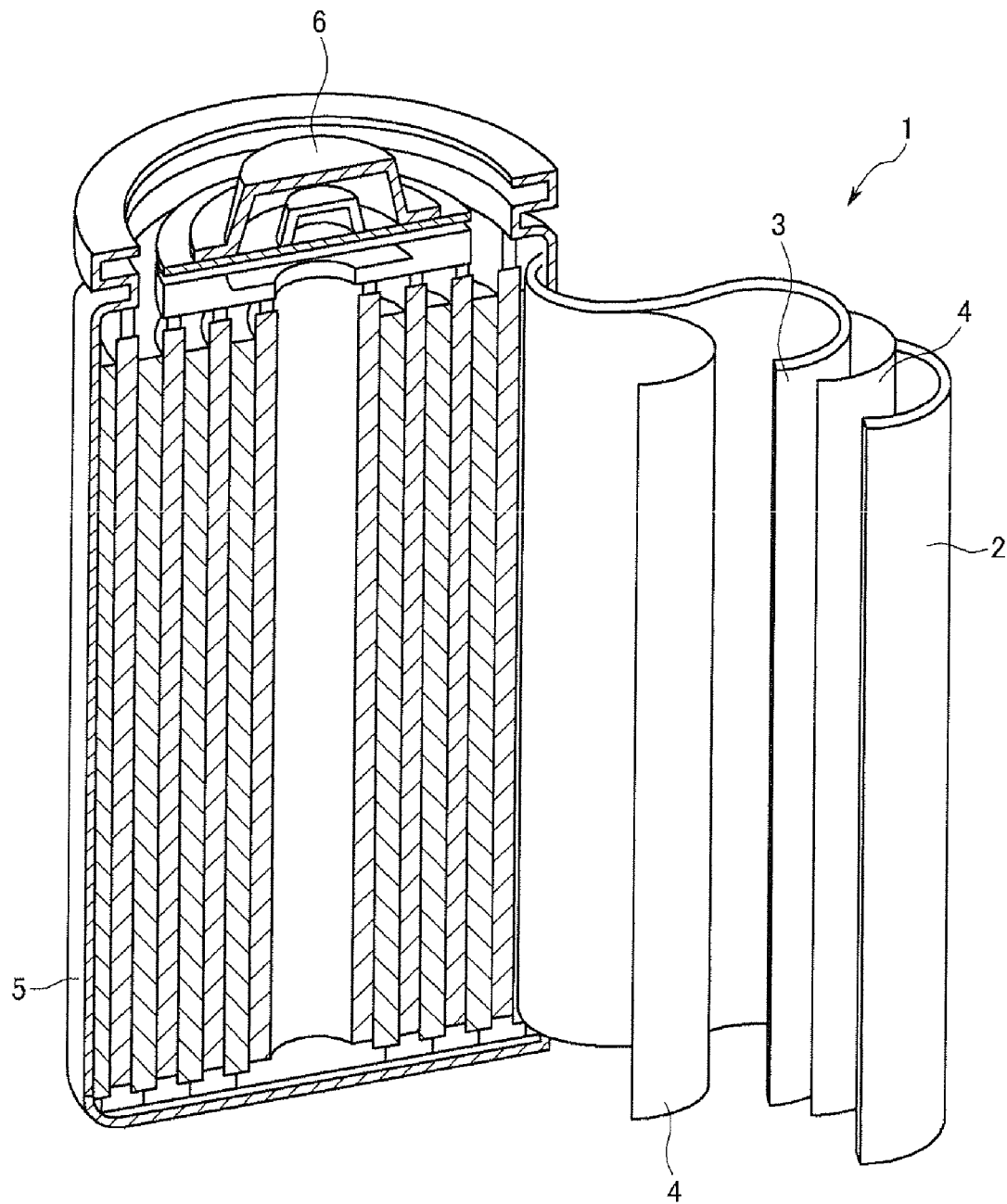
FIG. 1 schematically shows a rechargeable lithium battery according to one embodiment of the present invention.

Reference will now be made in detail to the various embodiments of the present invention, examples of which are illustrated in the accompanying drawings, wherein like reference numerals refer to the like elements throughout. The embodiments are described below in order to explain the present invention by referring to the figures.

A rechargeable lithium battery, according to various embodiments, includes: a negative electrode including lithium-vanadium oxide having the following Formula 1, which is capable of intercalating and deintercalating lithium ions, and a carbon-based material; a positive electrode including a positive active material capable of intercalating and deintercalating lithium ions; and an electrolyte including a monomer including alkylene oxide and a reactive double bond, a lithium salt, and a non-aqueous organic solvent.

$Li_xM_yV_zO_{2+d}$ [Chemical Formula 1]

In Formula 1, $0.1 \leq x \leq 2.5$, $0 \leq y \leq 0.5$, $0.5 \leq z \leq 1.5$, $0 \leq d \leq 0.5$, and M is at least one metal selected from the group consisting of Al, Cr, Mo, Ti, W, and Zr.

The negative electrode includes a lithium-vanadium oxide of Formula 1, which is capable of intercalating and deintercalating lithium ions, and a carbon-based material. According to various embodiments of the present invention, the negative electrode includes a lithium-vanadium oxide core material of Formula 1 and a carbon-based material coated thereon.

In the negative electrode, the carbon-based material has higher conductivity than the lithium-vanadium oxide and exhibits a higher level of lithium intercalation/deintercalation than the lithium-vanadium oxide, during the charge and discharge cycles. While intercalating/deintercalating lithium, an organic solvent tends to be significantly decomposed in the carbon-based material of the negative electrode. As the intercalation/deintercalation is repeated, dendrite is produced on the outside of the negative electrode, deteriorating cycle-life characteristics. According to one embodiment of the present invention, the reduction-decomposition reaction, of the organic solvent on the surface of the negative electrode, can be minimized by forming a functional group at a negative active material, solving the cycle-life deterioration problems experienced in high-capacity rechargeable lithium batteries.

According to aspects of the present invention, a monomer, including alkylene oxide and a reactive double bond, is applied to an electrolyte, and can thereby provide a rechargeable lithium battery that suppresses side-reactions at the interface of an oxide-based negative electrode and the electrolyte, thereby improving cycle-life.

Herein, the monomer may be represented by the following Formula 2.

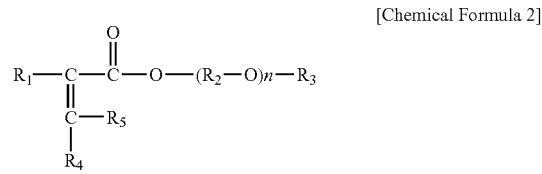

[Chemical Formula 2]

In Formula 2, $R_1$, $R_3$, and $R_5$ are each independently hydrogen or an alkyl, $R_2$ is an alkyl, $R_4$ is an alkoxy, and n is an integer ranging from $1 \leq n \leq 10$.

In the above Formula 2, $R_1$ and $R_3$ are a C1 to C6 alkyl. According to various embodiments, $R_1$ and $R_3$ are a C1 to C3 alkyls, $R_2$ is a C1 to C4 alkyl, and $R_4$ and $R_5$ are a C1 to C6 alkyls.

The monomer includes at least one selected from the group consisting of ethylene glycol methylether(metha)acrylate [EGME(M)A], ethylene glycol phenylether(metha)acrylate [EGPE(M)A], diethylene glycol methylether(metha)acrylate [DEGME(M)A], diethylene glycol 2-ethylhexylether(metha)acrylate [DEGEHE(M)A], polyethylene glycol methylether(metha)acrylate [PEGME(M)A], polyethylene glycol ethylether(metha)acrylate [PEGEE(M)A], polyethylene glycol 4-nonylphenylether(metha)acrylate [PEGNPE(M)A], polyethylene glycol phenylether(metha)acrylate [PEGPE(M)A], ethylene glycol dicyclopentenyl ether(metha)acrylate [EGDCPE(M)A], polypropylene glycol methylether(metha)acrylate [PPGME(M)A], polypropylene glycol 4-nonylphenylether(metha)acrylate, dipropylene glycol allylether (metha)acrylate, and mixtures thereof.

The monomer can be present in an amount ranging from about 0.01 to 5 wt %, based on the total weight of the electrolyte. The monomer can be present in an amount ranging from about 0.05 to 3 wt %. When the monomer is present in an amount of less than about 0.01 wt %, it may have little effect and may deteriorate the softness of a thin, negative electrode membrane. When the monomer is included in an amount of more than about 5 wt %, an excessively thick film may be formed, decreasing ion conductivity and increasing cell resistance, thereby degrading cycle-life characteristics.

When an electrolyte, including a monomer of the present invention, is used to fabricate a rechargeable lithium battery, the electrolyte can form a polymer film, having a plurality of alkylene oxide groups, that is disposed around a negative active material. The polymer film can minimize the decomposition of a non-aqueous organic solvent.

The monomer including the alkylene oxide and a reactive double bond is added to a lithium salt dissolved in a non-aqueous organic solvent, to constitute an electrolyte. The lithium salt is dissolved in the non-aqueous organic solvent, to supply lithium ions in the battery. The lithium salt may facilitate the basic operation of a rechargeable lithium battery, and can facilitate the transmission of lithium ions between the positive and negative electrodes.

The lithium salt may be at least one selected from the group consisting of LiBOB, LiFOB, $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$, where p and q are natural numbers, $LiSO_3CF_3$, LiCl, LiI, and combinations thereof. The lithium salt may be used in a concentration ranging from about 0.7 to 2.0M. When the lithium salt concentration is less than about 0.7M, electrolyte performance may be degraded, due to low electrolyte conductivity. When the lithium salt concentration is more than about 2.0M, lithium ion mobility may be reduced, due to an increase of the electrolyte's viscosity.

The non-aqueous organic solvent acts as a medium for transmitting ions taking part in the electrochemical reactions of the battery. The non-aqueous organic solvent may include an organic solvent selected from the group consisting of a carbonate-based solvent, an ester-based solvent, an ether-based solvent, a ketone-based solvent, and mixtures thereof. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and the like. Examples of the ester-based solvent may include n-methyl acetate, n-ethyl acetate, n-propyl acetate, dimethylacetate, methylpropinonate, ethylpropinonate, γ-butyrolactone, decanolide, valerolactone, mevalonolactone, caprolactone, and the like. Examples of the ether-based solvent include dibutyl ether, tetraglyme, diglyme, dimethoxyethane, 2-methyltetrahydrofuran, tetrahydrofuran, and the like. Examples of the ketone-based solvent include cyclohexanone, and the like.

The non-aqueous organic solvent may be used singularly or in a mixture. When the organic solvent is used in a mixture, a mixture ratio can be controlled in accordance with a desirable battery performance.

The carbonate-based solvent may include a mixture of a cyclic carbonate and a linear carbonate. The cyclic carbonate, for example, includes at least one selected from the group consisting of ethylene carbonate, butylenes carbonate, propylene carbonate, γ-butyrolactone, and the like. The cyclic carbonate can solvate lithium ions, and thereby improve the ion conductivity of the electrolyte.

The linear carbonate, for example, includes at least one selected from the group consisting of dimethyl carbonate, methylethyl carbonate, diethyl carbonate, and the like. The linear carbonate has low viscosity and reduces the viscosity of the electrolyte, resulting in an increased ion conductivity. Since the linear carbonate has a low flash point, it may lower a flash point of the electrolyte, if added in an excessive amount. When the cyclic carbonate and the chain carbonate are mixed together in the volume ratio ranging from about 1:1 to 1:9, the electrolyte performance may be enhanced.

The non-aqueous organic solvent may include a carbonate-based solvent and an aromatic hydrocarbon solvent in a volume ratio ranging from about 1:1 to 30:1.

The aromatic hydrocarbon solvent may be represented by the following Formula 3.

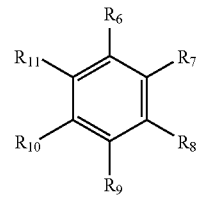

[Chemical Formula 3]

In Formula 3, $R_6$ to $R_{11}$ are independently selected from the group consisting of hydrogen, a halogen, an alkyl, a haloalkyl, and combinations thereof.

The aromatic hydrocarbon-based organic solvent may include, but is not limited to, at least one selected from the group consisting of benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The rechargeable lithium battery generally includes a positive electrode, a negative electrode, and an electrolyte. The battery may further include a separator as needed. The separator may be any suitable separator material used in conventional lithium secondary batteries. Non-limiting examples of suitable separator materials include polyethylene, polypropylene, polyvinylidene fluoride, and multi-layers thereof, such as, a polyethylene/polypropylene double-layered separator, a polyethylene/polypropylene/polyethylene triple-layered separator, or a polypropylene/polyethylene/polypropylene triple-layered separator.

The electrolyte may further include an additive. The additive can includes a compound including an ether group or an ethylene carbonate-based compound. The compound including an ether group can include at least one selected from the group consisting of dimethoxyethane (DME), bis(2-methoxyethylether) (DGM), triethylene glycol dimethylether (TriGM), tetraethylene glycol dimethylether (TetGM), polyethylene glycol dimethylether (PEGDME), propylene glycol dimethylether (PGDME), dioxolan, and mixtures thereof. According to various embodiments, tetraethylene glycol dimethylether (TetGM) may be the compound including an ether group. The compound including an ether group can also include an ethylene oxide group and thereby can suppress a reduction-decomposition reaction of an organic solvent, on the surface of the negative active material.

The compound including an ether group may be present in an amount ranging from about 0.05 to 5 wt %, based on the total weight of the electrolyte. The compound including an ether group may be present in an amount ranging from about 0.05 to 3 wt %. When the amount of the compound including an ether group is present in less than about 0.01 wt %, dissociation of lithium ions decreases. Thus, ion conductivity may be reduced. When the amount of the compound including an ether group is present in more than about 5 wt %, the mechanical properties of a film may be degraded.

The ethylene carbonate-based compound for improving thermal safety of the rechargeable lithium battery has the following Formula 4.

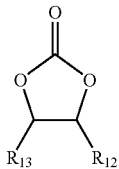

[Chemical Formula 4]

In Formula 4, $R_{12}$ and $R_{13}$ are independently selected from the group consisting of hydrogen, a halogen, cyano (CN), nitro ($NO_2$), and a fluorinated C1 to C5 alkyl, provided that at least one of $R_{12}$ and $R_{13}$ is a halogen, cyano (CN), nitro ($NO_2$), and a fluorinated C1 to C5 alkyl.

Specific examples of the ethylene carbonate-based compound include at least one selected from the group consisting of fluoroethylene carbonate, difluoroethylene carbonate, chloroethylene carbonate, dichloroethylene carbonate, bromoethylene carbonate, dibromoethylene carbonate, nitroethylene carbonate, cyanoethylene carbonate, and mixtures thereof. According to various embodiments, the ethylene carbonate-based compound is fluoroethylene carbonate.

A protection film with an appropriate density can be formed through a radical polymerization reaction during the first charge reaction. In addition, lithium ions can be transferred to a negative electrode including a lithium-vanadium oxide, due to an additive such as ethylene glycol or the like, that is dissolved in a solvent. The additive can be well-transferred during the charge/discharge cycle, due to a good wettability thereof.

FIG. 1 schematically shows a rechargeable lithium battery 1, according to an exemplary embodiment of the present invention. Referring to FIG. 1, the rechargeable lithium battery 1 includes a negative electrode 2, a positive electrode 3, a separator 4 interposed between the negative electrode 2 and the positive electrode 3, and an electrolyte (not shown), in which the separator 4 is immersed. The rechargeable lithium battery 1 includes a cell case 5 and a sealing member 6 to seal the cell case 5. The rechargeable lithium battery 1 is shown as having a cylindrical shape, however the rechargeable lithium battery 1 may be formed in various shapes, such as, prismatic shaped, coin shaped, or sheet shaped.

The negative electrode 2 includes a current collector, and a negative active material layer disposed on the current collector. The negative active material layer includes a negative active material. The negative active material can include a metal oxide of the following Formula 1, a carbon-based material, and a binder. The negative active material can include a core material of a lithium-vanadium oxide represented by Formula 1 and a carbon-based material coated on the surface of the core material.

$$Li_xM_yV_zO_{2+d}$$ [Chemical Formula 1]

In Formula 1, $0.1 \leq x \leq 2.5$, $0 \leq y \leq 0.5$, $0.5 \leq z \leq 1.5$, $0 \leq d \leq 0.5$, and M is at least one metal selected from the group consisting of Al, Cr, Mo, Ti, W, and Zr. When x, y, z, and d are out of the aforementioned range, the negative active material may have a high average potential of more than 1.0V, against a lithium metal, resulting in a decreasing discharge voltage.

The carbon-based material includes at least one selected from the group consisting of natural graphite, artificial graphite, graphitized carbon fiber, graphitized mesocarbon microbeads, fullerenes, amorphous carbon, and mixtures thereof. According to some embodiments, the artificial graphite or the natural graphite may be used as the carbon-based material.

The current collector may be selected from the group consisting of a copper foil, a nickel foil, a stainless steel foil, a titanium foil, a nickel foam, a copper foam, a polymer substrate coated with a conductive metal, and combinations thereof. According to some embodiments, the copper foil or the nickel foil may be used as the current collector.

Examples of the binder include polyvinyl alcohol, carboxylmethyl cellulose, hydroxypropylene cellulose, diacetylene cellulose, polyvinylchloride, polyvinylpyrrolidone, polytetrafluoroethylene, polyvinylidene fluoride, polyethylene, or polypropylene, but are not limited thereto.

In the electrode negative electrode 2, a conductive agent may be included in order to improve conductivity of the negative active material. Any electrically conductive material can be used as the conductive agent, provided the conductive material does not chemically react in the battery 1. Examples of the conductive agent include natural graphite, artificial graphite, carbon black, acetylene black, ketjen black, a carbon fiber, a metal powder, a metal fiber including copper, nickel, aluminum, silver, and the like, or a polyphenylene derivative.

The positive electrode 3 includes a positive active material. The positive active material can be a lithiated intercalation compound capable of intercalating and deintercalating lithium ions. For example, the lithiated intercalation compound may be a composite oxide including lithium and a metal selected from the group consisting of cobalt, manganese, nickel, and combinations thereof. The lithiated intercalation compound may be a compound selected from the group consisting of the compounds represented by the following Formulae 5 to 29.

$$Li_aA_{1-b}B_bD_2$$ [Chemical Formula 5]

In Formula 5, $0.95 \leq a \leq 1.1$ and $0 \leq b \leq 0.5$.

$$Li_aE_{1-b}B_bO_{2-c}F_c$$ [Chemical Formula 6]

In Formula 6, $0.95 \leq a \leq 1.1$, $0 \leq b \leq 0.5$, and $0 \leq c \leq 0.05$.

$$LiCo_{2-b}O_{4-c}F_c$$ [Chemical Formula 7]

In Formula 7, $0 \leq b \leq 0.5$, and $0 \leq c \leq 0.05$.

$$LiMn_{2-b}O_{4-c}F_c$$ [Chemical Formula 8]

In Formula 8, $0 \leq b \leq 0.5$, and $0 \leq c \leq 0.05$.

$$Li_aNi_{1-b-c}Co_bB_cD_\alpha$$ [Chemical Formula 9]

In Formula 9, $0.95 \leq a \leq 1.1$, $0 \leq b \leq 0.5$, $0 \leq c \leq 0.05$, and $0 < \alpha \leq 2$.

$$Li_aNi_{1-b-c}Co_bO_{2-\alpha}F_\alpha \quad \text{[Chemical Formula 10]}$$

In Formula 10, $0.95 \leq a \leq 1.1$, $0 \leq b \leq 0.5$, $0 \leq c \leq 0.05$, and $0 < \alpha \leq 2$.

$$Li_aNi_{1-b-c}Co_bO_{2-\alpha}F_2 \quad \text{[Chemical Formula 11]}$$

In Formula 11, $0.95 \leq a \leq 1.1$, $0b \leq 0.5$, and $0 \leq c \leq 0.05$.

$$Li_aNi_{1-b-c}Mn_bB_cD_\alpha \quad \text{[Chemical Formula 12]}$$

In Formula 12, $0.95 \leq a \leq 1.1$, $0 \leq b \leq 0.5$, $0 \leq c \leq 0.05$, and $0 < \alpha \leq 2$.

$$Li_aNi_{1-b-c}Mn_bO_{2-\alpha}F_\alpha \quad \text{[Chemical Formula 13]}$$

In Formula 13, $0.95 \leq a \leq 1.1$, $0 \leq b \leq 0.5$, $0 \leq c \leq 0.05$, and $0 < \alpha < 2$.

$$Li_aNi_{1-b-c}Mn_bO_{2-\alpha}F_2 \quad \text{[Chemical Formula 14]}$$

In Formula 14, $0.95 \leq a \leq 1.1$, $0 \leq b \leq 0.5$, and $0 \leq c \leq 0.05$.

$$Li_aNi_bE_cG_dO_2 \quad \text{[Chemical Formula 15]}$$

In Formula 15, $0.90 \leq a \leq 1.1$, $0 \leq b \leq 0.9$, $0 \leq c \leq 0.5$, and $0.001 \leq d \leq 0.1$.

$$Li_aNi_bCo_cMn_dG_eO_2 \quad \text{[Chemical Formula 16]}$$

In Formula 16, $0.90 \leq a \leq 1.1$, $0 \leq b \leq 0.9$, $0 \leq c \leq 0.5$, $0 \leq d \leq 0.5$, and $0.001 \leq e \leq 0.1$.

$$Li_aNiG_bO_2 \quad \text{[Chemical Formula 17]}$$

In Formula 17, $0.90 \leq a \leq 1.1$, and $0.001 \leq b \leq 0.1$.

$$Li_aCoG_bO_2 \quad \text{[Chemical Formula 18]}$$

In Formula 18, $0.90 \leq a \leq 1.1$, and $0.001 \leq b \leq 0.1$.

$$Li_aMnG_bO_2 \quad \text{[Chemical Formula 19]}$$

In Formula 19, $0.90 \leq a \leq 1.1$, and $0.001 \leq b \leq 0.1$.

$$Li_aMn_2G_bO_4 \quad \text{[Chemical Formula 20]}$$

In Formula 20, $0.90 \leq a \leq 1.1$, and $0.001 \leq b \leq 0.1$.

$$HO_2 \quad \text{[Chemical Formula 21]}$$

$$HS_2 \quad \text{[Chemical Formula 22]}$$

$$LiHS_2 \quad \text{[Chemical Formula 23]}$$

$$V_2O_5 \quad \text{[Chemical Formula 24]}$$

$$LiV_2O_5 \quad \text{[Chemical Formula 25]}$$

$$LiIO_2 \quad \text{[Chemical Formula 26]}$$

$$LiNiVO_4 \quad \text{[Chemical Formula 27]}$$

$$Li_{3-f}J_2(PO_4)_3 (0 \leq f \leq 3) \quad \text{[Chemical Formula 28]}$$

$$Li_{3-f}Fe_2(PO_4)_3 (0 \leq f \leq 2) \quad \text{[Chemical Formula 29]}$$

In the above Formulae 5 to 29: A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn, and combinations thereof; F is selected from the group consisting of F, S, P, and combinations thereof; G is selected from the group consisting of Al, Cr, Mn, Fe, Mg, La, Ce, Sr, V, a lanthanide element, and combinations thereof; H is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

The positive electrode 3 can be fabricated as follows: a positive active material composition, including the positive active material, a binder, and optionally a conductive agent mixed in a solvent, is applied on a positive current collector. The positive current collector can be aluminum.

Rechargeable lithium batteries may be classified as lithium ion batteries, lithium ion polymer batteries, and lithium polymer batteries, according to the presence of a separator and the kind of electrolyte used in the battery. The rechargeable lithium batteries may be formed as a variety of shapes and sizes, including as cylindrical shaped, prismatic shaped, sheet shaped and coin shaped. They may be a thin film battery or be rather bulky in size. Structures and fabricating methods for lithium ion batteries, pertaining to aspects of the present invention, are well known in the art.

The following examples illustrate aspects of the present invention in more detail. These examples, however, should not in any sense be interpreted as limiting the scope of the present invention.

EXAMPLE 1

Ethylenecarbonate (EC), dimethylcarbonate (DEC), and ethylmethylcarbonate (EMC) were mixed in a volume ratio of 30:30:70, to prepare a mixed solvent. Then, 1.3M of $LiPF_6$ was dissolved in the mixed solvent, and 3 wt % of polyethylene glycol methylether methacrylate was added thereto, to prepare an electrolyte.

Next, a lithium-vanadium oxide negative active material, coated with a carbon-based material, was mixed with a polyvinylidene fluoride binder and a super-P conductive agent, in a composition weight ratio of 94/3/3, in a mixed N-methylpyrrolidone solvent, to prepare a negative active material slurry. The slurry was coated on an aluminum current collector, dried, and compressed to prepare a negative electrode.

To prepare a positive active material slurry, an $LiCoO_2$ positive active material, a polyvinylidene fluoride binder, and a super-P conductive agent were mixed, in a composition weight ratio of 94/3/3, in a mixed solvent of N-methylpyrrolidone. The slurry was coated on an aluminum current collector, dried, and compressed, to prepare a positive electrode.

The positive electrode, the negative electrode, and the electrolyte were used to fabricate a rechargeable lithium battery cell, according to a conventional method.

Comparative Example 1

A rechargeable lithium battery cell was fabricated according to the same method as in Example 1, except without using the 3 wt % of polyethylene glycol methylether methacrylate.

Figure 2:
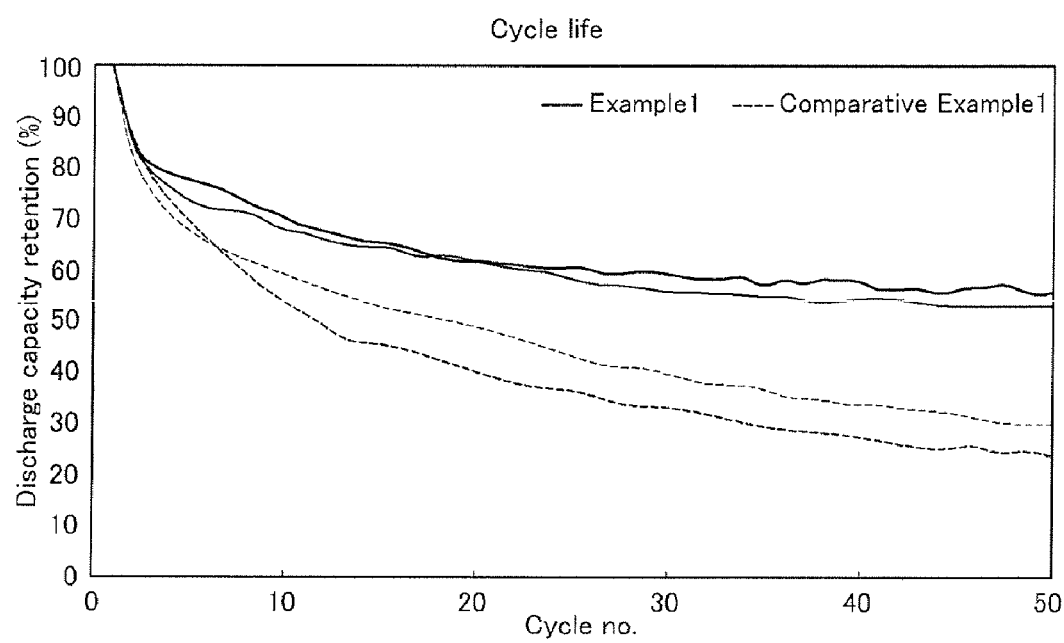
FIG. 2 is a graph showing capacity retention after 50th charge and discharge.

The rechargeable lithium battery cells fabricated according to Example 1 and Comparative Example 1 were charged with 0.8 C, up to 4.35V, and discharged at 1 C down to 2.75V, over 50 cycles. Their capacity retentions up to the $50^{th}$ cycle were measured twice, and the results are shown in FIG. 2. The capacity retention after the $50^{th}$ charge/discharge cycle can be calculated by a ratio of the discharge capacity at the $1^{st}$ charge/discharge cycle to the discharge capacity at the $50^{th}$ charge/discharge cycle. As shown in FIG. 2, the lithium rechargeable battery cell according to Example 1 (including the polymer film at the negative electrode) had excellent cycle-life characteristics as compared to Comparative Example 1. The lithium rechargeable battery cell of Comparative Example 1 did not include a polymer film, and demonstrated sharply degraded cycle-life characteristics beginning at the 40$^{th}$ charge/discharge cycle. In addition, the lithium rechargeable battery cell of Example 1 had greater initial discharge capacity retention, as compared with that of Comparative Example 1.

The electrolyte for a rechargeable lithium battery, according to aspects of the present invention, can suppress the reactivity of a negative electrode and can stabilize the surface of the negative electrode, due to a polymer film formed on the negative electrode, resulting in an improvement of cycle-life characteristics.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A rechargeable lithium battery comprising:
   a negative electrode comprising a carbon-based material and a lithium-vanadium oxide according to the following Formula 1, which is capable of intercalating and deintercalating lithium ions;
   a positive electrode comprising a positive active material capable of intercalating and deintercalating lithium ions; and
   an electrolyte comprising a monomer comprising an alkylene oxide and a reactive double bond, a lithium salt, and a non-aqueous organic solvent, wherein the monomer is present in an amount of about 0.01 to 5 wt %, based on the total weight of the electrolyte,

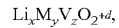   Formula 1:

wherein $0.1 \leq x \leq 2.5$, $0 \leq y \leq 0.5$, $0.5 \leq z \leq 1.5$, $0 \leq d \leq 0.5$, and M is at least one metal selected from the group consisting of Al, Cr, Mo, Ti, W, and Zr, and
   wherein the monomer is represented by the following Formula 2:

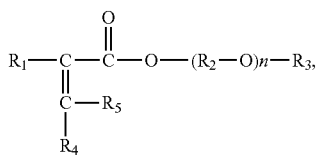   Formula 2:

wherein $R_1$, $R_3$, and $R_5$ are each independently hydrogen or an alkyl, $R_2$ is an alkyl, $R_4$ is an alkoxy, and n is an integer ranging from $1 \leq n \leq 10$.

2. The rechargeable lithium battery of claim 1, wherein the carbon-based material comprises at least one selected from the group consisting of natural graphite, artificial graphite, graphitized carbon fiber, graphitized mesocarbon microbeads, fullerenes, amorphous carbon, and a combination thereof.

3. The rechargeable lithium battery of claim 1, wherein the negative electrode comprises a core comprising the lithium-vanadium oxide and a coating disposed thereon comprising the carbon-based material.

4. The rechargeable lithium battery of claim 1, wherein the monomer comprises at least one selected from the group consisting of ethylene glycol methylether (metha)acrylate [EGME(M)A], ethylene glycol phenylether (metha)acrylate [EGPE(M)A], diethylene glycol methylether (metha)acrylate [DEGME(M)A], diethylene glycol 2-ethylhexylether (metha)acrylate [DEGEHE(M)A], polyethylene glycol methylether (metha)acrylate [PEGME(M)A], polyethylene glycol ethylether (metha)acrylate [PEGEE(M)A], polyethylene glycol 4-nonylphenylether (metha)acrylate [PEGNPE(M)A], polyethylene glycol phenylether (metha)acrylate [PEGPE(M)A], ethylene glycol dicyclopentenyl ether (metha)acrylate [EGDCPE(M)A], polypropylene glycol methylether (metha)acrylate [PPGME(M)A], polypropylene glycol 4-nonylphenylether (metha)acrylate, dipropylene glycol allylether (metha)acrylate, and a combination thereof.

5. The rechargeable lithium battery of claim 1, wherein the lithium salt is at least one selected from the group consisting of LiBOB, LiFOB, $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_4$, $LiAlCl_4$, $LiN(C_pF_{2p+1}SO_2)(C_qF_{2q+1}SO_2)$ where p and q are natural numbers, $LiSO_3CF_3$, LiCl, LiI, and a combination thereof.

6. The rechargeable lithium battery of claim 1, wherein the lithium salt is present at a concentration of about 0.7 to 2M.

7. The rechargeable lithium battery of claim 1, wherein the non-aqueous organic solvent comprises an organic solvent selected from the group consisting of a carbonate-based solvent, an ester-based solvent, an ether-based solvent, a ketone-based solvent, and a combination thereof.

8. The rechargeable lithium battery of claim 1, wherein the non-aqueous organic solvent comprises a cyclic carbonate and a linear carbonate in a volume ratio of about 1:1 to 1:9.

9. The rechargeable lithium battery of claim 8, wherein the cyclic carbonate comprises at least one selected from the group consisting of ethylene carbonate (EC), propylene carbonate (PC), butylenecarbonate (BC), γ-butyrolactone (γ-BL), and a combination thereof.

10. The rechargeable lithium battery of claim 8, wherein the linear carbonate comprises at least one selected from the group consisting of dimethyl carbonate (DMC), diethyl carbonate (DEC), dipropyl carbonate (DPC), methylpropyl carbonate (MPC), ethylpropyl carbonate (EPC), methylethyl carbonate (MEC), and a combination thereof.

11. The rechargeable lithium battery of claim 8, wherein the non-aqueous organic solvent further comprises an aromatic hydrocarbon solvent.

12. The rechargeable lithium battery of claim 11, wherein the non-aqueous organic solvent comprises a carbonate-based solvent and an aromatic hydrocarbon solvent in a volume ratio of about 1:1 to 10:1.

13. The rechargeable lithium battery of claim 11, wherein the aromatic hydrocarbon solvent is represented by the following Formula 3:

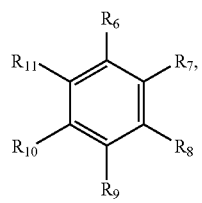   [Chemical Formula 3]

wherein $R_6$ to $R_{11}$ are independently selected from the group consisting of hydrogen, a halogen, an alkyl, a haloalkyl, and a combination thereof.

14. The rechargeable lithium battery of claim 1, wherein the electrolyte further comprises an additive of a compound comprising an ether group, an ethylene carbonate-based compound having the following Formula 4, or a mixture thereof,

[Chemical Formula 4]

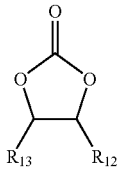

wherein $R_{12}$ and $R_{13}$ are independently selected from the group consisting of hydrogen, a halogen, cyano (CN), nitro ($NO_2$), and a fluorinated C1 to C5 alkyl; and at least one of $R_{12}$ and $R_{13}$ is a halogen, cyano (CN), nitro ($NO_2$), and a fluorinated C1 to C5 alkyl.

15. The rechargeable lithium battery of claim 14, wherein the compound comprising an ether group is selected from the group consisting of dimethoxyethane (DME), bis(2-methoxyethylether) (DGM), triethylene glycol dimethylether (TriGM), tetraethylene glycol dimethylether (TetGM), polyethylene glycol dimethylether (PEGDME), propylene glycol dimethylether (PGDME), dioxolan, and a combination thereof.

16. The rechargeable lithium battery of claim 14, wherein the compound comprising an ether group is present in an amount of about 0.05 to 5 wt % based on the total weight of the electrolyte.

17. The rechargeable lithium battery of claim 1, wherein the positive active material is selected from the group consisting of the compounds of the following Formulae 5 to 29:

$Li_aA_{1-b}B_bD_2$,    Chemical Formula 5 wherein $0.95 \leq a \leq 1.1$ and $0 \leq b \leq 0.5$;

$Li_aE_{1-b}B_bO_{2-c}F_c$,    Chemical Formula 6 wherein $0.95 \leq a \leq 1.1$, $0 \leq b \leq 0.5$, and $0 \leq c \leq 0.05$;

$LiCo_{2-b}O_{4-c}F_c$,    Chemical Formula 7 wherein $0 \leq b \leq 0.5$, and $0 \leq c \leq 0.05$;

$LiMn_{2-b}O_{4-c}F_c$,    Chemical Formula 8 wherein $0 \leq b \leq 0.5$, and $0 \leq c \leq 0.05$, $Li_aNi_{1-b-c}Co_bB_cD_\alpha$,    Chemical Formula 9 wherein $0.95 \leq a \leq 1.1$, $0 \leq b \leq 0.5$, $0 \leq c \leq 0.05$, and $0 < \alpha \leq 2$;

$Li_aNi_{1-b-c}Co_bO_{2-\alpha}F_\alpha$,    Chemical Formula 10 wherein $0.95 \leq a \leq 1.1$, $0 \leq b \leq 0.5$, $0 \leq c \leq 0.05$, and $0 < \alpha \leq 2$;

$Li_aNi_{1-b-c}Co_bO_{2-\alpha}F_2$,    Chemical Formula 11 wherein $0.95 \leq a \leq 1.1$, $0b \leq 0.5$, and $0 \leq c \leq 0.05$;

$Li_aNi_{1-b-c}Mn_bB_cD_\alpha$,    Chemical Formula 12 wherein $0.95 \leq a \leq 1.1$, $0 \leq b \leq 0.5$, $0 \leq c \leq 0.05$, and $0 < \alpha \leq 2$;

$Li_aNi_{1-b-c}Mn_bO_{2-\alpha}F_\alpha$,    Chemical Formula 13 wherein $0.95 \leq a \leq 1.1$, $0 \leq b \leq 0.5$, $0 \leq c \leq 0.05$, and $0 < \alpha < 2$;

$Li_aNi_{1-b-c}Mn_bO_{2-\alpha}F_2$,    Chemical Formula 14 wherein $0.95 \leq a \leq 1.1$, $0 \leq b \leq 0.5$, and $0 \leq c \leq 0.05$;

$Li_aNi_bE_cG_dO_2$,    Chemical Formula 15 wherein $0.90 \leq a \leq 1.1$, $0 \leq b \leq 0.9$, $0 \leq c \leq 0.5$, and $0.001 \leq d \leq 0.1$;

$Li_aNi_bCo_cMn_dG_eO_2$,    Chemical Formula 16 wherein $0.90 \leq a \leq 1.1$, $0 \leq b \leq 0.9$, $0 \leq c \leq 0.5$, $0 \leq d \leq 0.5$, and $0.001 \leq e \leq 0.1$;

$Li_aNiG_bO_2$,    Chemical Formula 17 wherein $0.90 \leq a \leq 1.1$, and $0.001 \leq b \leq 0.1$;

$Li_aCoG_bO_2$,    Chemical Formula 18 wherein $0.90 \leq a \leq 1.1$, and $0.001 \leq b \leq 0.1$;

$Li_aMnG_bO_2$,    Chemical Formula 19 wherein $0.90 \leq a \leq 1.1$, and $0.001 \leq b \leq 0.1$;

$Li_aMn_2G_bO_4$,    Chemical Formula 20 wherein $0.90 \leq a \leq 1.1$, and $0.001 \leq b \leq 0.1$;

$HO_2$;    Chemical Formula 21

$HS_2$;    Chemical Formula 22

$LiHS_2$;    Chemical Formula 23

$V_2O_5$;    Chemical Formula 24

$LiV_2O_5$;    Chemical Formula 25

$LiIO_2$;    Chemical Formula 26

$LiNiVO_4$;    Chemical Formula 27

$Li_{3-f}J_2(PO_4)_3 (0 \leq f \leq 3)$;    Chemical Formula 28 and $Li_{3-f}Fe_2(PO_4)_3 (0 \leq f \leq 2)$,    Chemical Formula 29 wherein in the above Formulae 5 to 29: A is selected from the group consisting of Ni, Co, Mn, and a combination thereof; B is selected from the group consisting of Al, Ni, Co, Mn, Cr, Fe, Mg, Sr, V, a rare earth element, and a combination thereof; D is selected from the group consisting of O, F, S, P, and a combination thereof; E is selected from the group consisting of Co, Mn, and a combination thereof; F is selected from the group consisting of F, S, P, and a combination thereof; G is selected from the group consisting of Al, Cr, Mn, Fe, Mg, La, Ce, Sr, V, a lanthanide element, and a combination thereof; H is selected from the group consisting of Ti, Mo, Mn, and a combination thereof; I is selected from the group consisting of Cr, V, Fe, Sc, Y, and a combination thereof; J is selected from the group consisting of V, Cr, Mn, Co, Ni, Cu, and a combination thereof.

18. The rechargeable lithium battery of claim 1, wherein the rechargeable lithium battery is a lithium ion battery or a lithium polymer battery.

19. The rechargeable lithium battery of claim 1, wherein the monomer is polymerized into a polymer film on the negative electrode, when current flows in the rechargeable lithium battery.

20. The rechargeable lithium battery of claim 1, further comprising a polymer film formed by the polymerization of the monomer, disposed on the negative electrode.

21. The rechargeable lithium battery of claim 20, wherein the polymer film comprises alkylene oxide groups.

* * * * *

UNITED STATES PATENT AND TRADEMARK OFFICE
CERTIFICATE OF CORRECTION

PATENT NO. : 8,110,305 B2
APPLICATION NO. : 11/834335
DATED : February 7, 2012
INVENTOR(S) : Su-Yeong Park et al.

It is certified that error appears in the above-identified patent and that said Letters Patent is hereby corrected as shown below:

Column 14, Claim 5, line 17    Delete "LiI,"

Insert -- LiI, --

Column 14, Claim 12, line 45    Delete "an"

Insert -- the --

Column 16, Claim 17, line 24,    Delete "LiIO$_2$;"

Chemical Formula 26    Insert -- LiIO$_2$; --

Signed and Sealed this
Twenty-ninth Day of January, 2013

David J. Kappos
*Director of the United States Patent and Trademark Office*